United States Patent
Spahlinger et al.

(10) Patent No.: US 10,996,088 B2
(45) Date of Patent: May 4, 2021

(54) METHOD FOR OPERATING A MAGNETO INDUCTIVE FLOW MEASURING DEVICE FOR MEASURING FLOW VELOCITY OR VOLUME FLOW OF A MEDIUM IN A MEASURING TUBE

(71) Applicant: Endress+Hauser Flowtec AG, Reinach (CH)

(72) Inventors: Andre Spahlinger, Bad Bellingen (DE); Martin Binzer, Zwingen (CH); Timo Kretzler, Binzen (DE)

(73) Assignee: Endress+Hauser Flowtec AG, Reinach (CH)

( * ) Notice: Subject to any disclaimer, the term of this patent is extended or adjusted under 35 U.S.C. 154(b) by 299 days.

(21) Appl. No.: 16/304,434

(22) PCT Filed: Apr. 27, 2017

(86) PCT No.: PCT/EP2017/060083
§ 371 (c)(1),
(2) Date: Nov. 26, 2018

(87) PCT Pub. No.: WO2017/207187
PCT Pub. Date: Dec. 7, 2017

(65) Prior Publication Data
US 2020/0041318 A1    Feb. 6, 2020

(30) Foreign Application Priority Data
May 31, 2016    (DE) ..................... 10 2016 110 024.2

(51) Int. Cl.
*G01F 1/58* (2006.01)
*G01F 1/60* (2006.01)
*G01F 1/64* (2006.01)

(52) U.S. Cl.
CPC ............... *G01F 1/586* (2013.01); *G01F 1/60* (2013.01)

(58) Field of Classification Search
CPC ... G01F 1/56; G01F 1/58; G01F 1/588; G01F 1/584; G01F 1/586; G01F 1/60; G01F 1/64
See application file for complete search history.

(56) References Cited

U.S. PATENT DOCUMENTS

| | | |
|---|---|---|
| 2005/0021248 A1 | 1/2005 | Mitsutake |
| 2009/0199655 A1 | 8/2009 | Budmiger |

FOREIGN PATENT DOCUMENTS

| | | |
|---|---|---|
| CN | 85106293 A | 2/1987 |
| CN | 101038189 A | 9/2007 |

(Continued)

OTHER PUBLICATIONS

Search Report for German Patent Application No. 10 2016 110 024.2, German Patent Office, dated Mar. 1, 2017, 8 pp.

(Continued)

*Primary Examiner* — Herbert K Roberts
(74) *Attorney, Agent, or Firm* — Mark A. Logan; Endress+Hauser (USA) Holding Inc.

(57) ABSTRACT

The invention relates to a method for operating a magneto inductive flow measuring device and to a magneto inductive flow measuring device, wherein at least one magnet system having at least one coil produces a periodically polarity changing magnetic field extending essentially perpendicularly to a longitudinal axis of the measuring tube for inducing a flow dependent voltage in the medium, wherein in a measuring phase for registering at least one voltage value for ascertaining flow velocity or volume flow an essentially constant magnetic field is produced, which is reverse poled in a polarity reversal phase, wherein energy supply during (Continued)

the polarity reversal phase occurs completely from a capacitor.

13 Claims, 5 Drawing Sheets

(56) References Cited

FOREIGN PATENT DOCUMENTS

| | | | |
|---|---|---|---|
| CN | 203758555 U | 8/2014 | |
| CN | 105378440 A | 3/2016 | |
| DE | 3037305 A1 | 6/1982 | |
| DE | 4423169 A1 | 1/1996 | |
| DE | 10312058 A1 | 9/2004 | |
| DE | 102014107200 A1 | 11/2015 | |
| EP | 1460394 A2 | 9/2004 | |
| EP | 2827110 A1 | 1/2015 | |
| JP | 02122221 A | 5/1990 | |
| WO | 2009154116 A1 | 12/2009 | |
| WO | WO-2009154116 A1 * | 12/2009 | ............. G01F 1/582 |
| WO | 2009154116 A1 | 12/2011 | |

OTHER PUBLICATIONS

Search Report for International Patent Application No. PCT/EP2017/060083, WIPO, dated Jul. 26, 2017, 15 pp.

DC Field Effects on Streaming Electrification in Insulating Oils, H. Wu and S. Jayaram Department of Elec. & Comp. Eng. University of Waterloo, Waterloo, Ontario, Canada.

* cited by examiner

METHOD FOR OPERATING A MAGNETO INDUCTIVE FLOW MEASURING DEVICE FOR MEASURING FLOW VELOCITY OR VOLUME FLOW OF A MEDIUM IN A MEASURING TUBE

CROSS-REFERENCE TO RELATED APPLICATIONS

The present application is related to and claims the priority benefit of German Patent Application No. 10 2016 110 024.2, filed on May 31, 2016 and International Patent Application No. PCT/EP2017/060083 filed on Apr. 17, 2017, the entire contents of which are incorporated herein by reference.

TECHNICAL FIELD

The invention relates to a method for operating a magneto inductive flow measuring device for measuring flow velocity or volume flow of a medium in a measuring tube and to a magneto inductive flow measuring device.

BACKGROUND

Magneto inductive flow measuring devices have been applied for flow measurement for a long time and have proved themselves effective for the task. The principle of magneto inductive flow measurement is based on the inducing of a flow dependent, electrical voltage in a conductive medium flowing through a pipeline by a magnetic field directed perpendicular to the flow. The magnetic field is usually produced by a magnet system having one or more coils. The flow dependent voltage is tapped by two measuring electrodes and evaluated by a measuring apparatus. With knowledge of the conductivity of the medium and the measured voltage, the known magnetic field can be used to determine the flow of the medium through the pipeline.

In order to increase signal quality, the polarity of the magnetic field is usually periodically reversed. By comparing voltage measured values measured at the different magnetic field polarities, disturbance variables such as, for example, signal noise or a voltage offset, can be eliminated.

The switching between two magnetic field polarities is performed by changing the polarity of an electrical voltage placed on the magnetic field producing coil. The polarity reversal phase takes, however, a certain amount of time, since coils resist a change of the magnetic field according to Lenz's law and, thus, have a certain amount of inertia. During the polarity reversal time, no flow measurement can be performed, so that the polarity reversal phase represents lost time.

The state of the art, as represented by, for example, disclosure document DE10312058A1, works against this problem by applying an overvoltage to magnetic field producing coils for accelerating the polarity reversal phase, wherein the overvoltage is significantly greater than the voltage during the measuring phase. In this way, the duration of the polarity reversal phase can be significantly lessened.

However, the shortening of the polarity reversal phase by applying an overvoltage places a high power demand on the power supply, since in the end phase of a polarity reversal phase there is simultaneously a high voltage on the coil and a large amount of electrical current flowing through the coil.

SUMMARY

Objects of the invention include, consequently, a method for operating a magneto inductive flow measuring device and a magneto inductive flow measuring device, in the case of which the power demand on the power supply is reduced.

The objects of the invention are achieved by a method as defined in the independent claim 1 as well as by a magneto inductive flow measuring device as defined in the independent claim 8.

The method of the invention is performed by a magneto inductive flow measuring device, wherein at least one magnet system produces a magnetic field extending essentially perpendicularly to a longitudinal axis of the measuring tube and periodically changing polarity for inducing a flow dependent voltage in the medium, wherein in a measuring phase for registering at least one voltage value for ascertaining flow velocity or volume flow an essentially constant magnetic field is produced, which is reverse poled in a polarity reversal phase;

and wherein an electronic operating circuit with a polarity reversal circuit controls the connecting of the magnet system via the polarity reversal circuit to a power supply, wherein the power supply has a first voltage source and a second voltage source, wherein the second voltage source has a capacitor unit, which serves as an energy storer;

wherein the first voltage source is adapted to operate the magnet system during the measuring phase and wherein the second voltage source is adapted to operate the magnet system during the polarity reversal phase, wherein the polarity reversal circuit alternates the polarity of the connecting;

wherein at least two measuring electrodes coupled with the medium register a voltage induced in the medium by the magnetic field, wherein the electronic operating circuit is, furthermore, adapted to evaluate the voltage registered by the measuring electrodes;

wherein the method comprises steps as follows:

applying via the polarity reversal circuit an essentially constant voltage to the magnet system from the first voltage source and charging the capacitor unit during a measuring phase;

changing the polarity of the connecting by means of the polarity reversal circuit and applying via the polarity reversal circuit a variable overvoltage to the magnet system from the second voltage source during the polarity reversal phase, applying via the polarity reversal circuit a constant voltage to the magnet system from the first voltage source during the measuring phase following the polarity reversal phase, wherein the overvoltage has a beginning value at the beginning of the polarity reversal phase and an end value at the end of the polarity reversal phase, and wherein the magnitude of the starting value is greater than the magnitude of the end value, and wherein the capacitor unit is charged by the magnet system at least at the beginning of the polarity reversal phase due to a transient characteristic of the magnet system, and wherein, at least at the end of the polarity reversal phase, energy supply of the magnet system occurs at least partially from the capacitor unit.

In an embodiment of the method, at least at the end of the polarity reversal phase, energy supply of the magnet system is completely from the capacitor unit.

In an embodiment of the method, during the entire polarity reversal phase, energy supply is completely from the capacitor.

In an embodiment of the method, the magnitude of the end value is set greater than the magnitude of the constant voltage.

In an embodiment of the method, the magnitude of the end value is set essentially equal to the magnitude of the constant voltage.

In an embodiment of the method, the magnitude of the polarity reversal voltage is limited at 120V and especially at 100V and preferably at 90V.

In an embodiment of the method, the capacitor is charged during the measuring phase from the second voltage source.

A magneto inductive flow measuring device of the invention for measuring flow velocity or volume flow of a medium in a measuring tube includes for application of the method, in such case:

A measuring tube;

at least one magnet system having, in each case, at least one coil, which magnet system is adapted to produce a magnetic field extending essentially perpendicularly to a longitudinal axis of the measuring tube;

and, arranged in the measuring tube, at least two measuring electrodes, which are coupled with the medium, and wherein the measuring electrodes are adapted to register a flow dependent voltage in the medium induced by the magnetic field;

and at least one power supply, which has a first voltage source and a second voltage source, wherein the second voltage source has a capacitor unit, which serves as an energy storer;

and an electronic operating circuit having a polarity reversal circuit and adapted to operate the magnet system and the measuring electrodes and, with the polarity reversal circuit, to control the connecting of the magnet system via the polarity reversal circuit to the power supply.

In an embodiment of the flow measuring device, the second voltage source is adapted to charge the capacitor unit during a measuring phase.

In an embodiment of the flow measuring device, the capacitor unit is adapted to be charged by the magnet system at least at the beginning of a polarity reversal phase.

In an embodiment of the flow measuring device, the polarity reversal circuit includes at least a first alternation element and is adapted to connect the magnet system either to the first voltage source or to the second voltage source.

In an embodiment of the flow measuring device, the first alternation element includes at least one transistor and at least one diode.

In an embodiment of the flow measuring device, the operating circuit includes a central control unit for controlling the polarity reversal circuit and/or the alternation circuit.

In an embodiment of the flow measuring device, the polarity reversal circuit includes four switch elements, wherein a first switch element and a second switch element form a first series connection, and wherein a third switch element and a fourth switch element form a second series connection and wherein the first series connection and the second series connection are connected in parallel.

In an embodiment of the flow measuring device, the operation of the magnet system is accomplished with a voltage obtained by tapping a first electrical potential between the first switch element and the second switch element and a second electrical potential between the third switch element and the fourth switch element.

There is thus provided by the present invention a method for operating a magneto inductive flow measuring device, which method is characterized by a lower power demand on a power supply. The present invention also provides a corresponding magneto inductive flow measuring device.

BRIEF DESCRIPTION OF THE DRAWINGS

The invention will now be explained based on examples of embodiments presented in the drawing, the figures of which show as follows.

DETAILED DESCRIPTION

Figure 1:
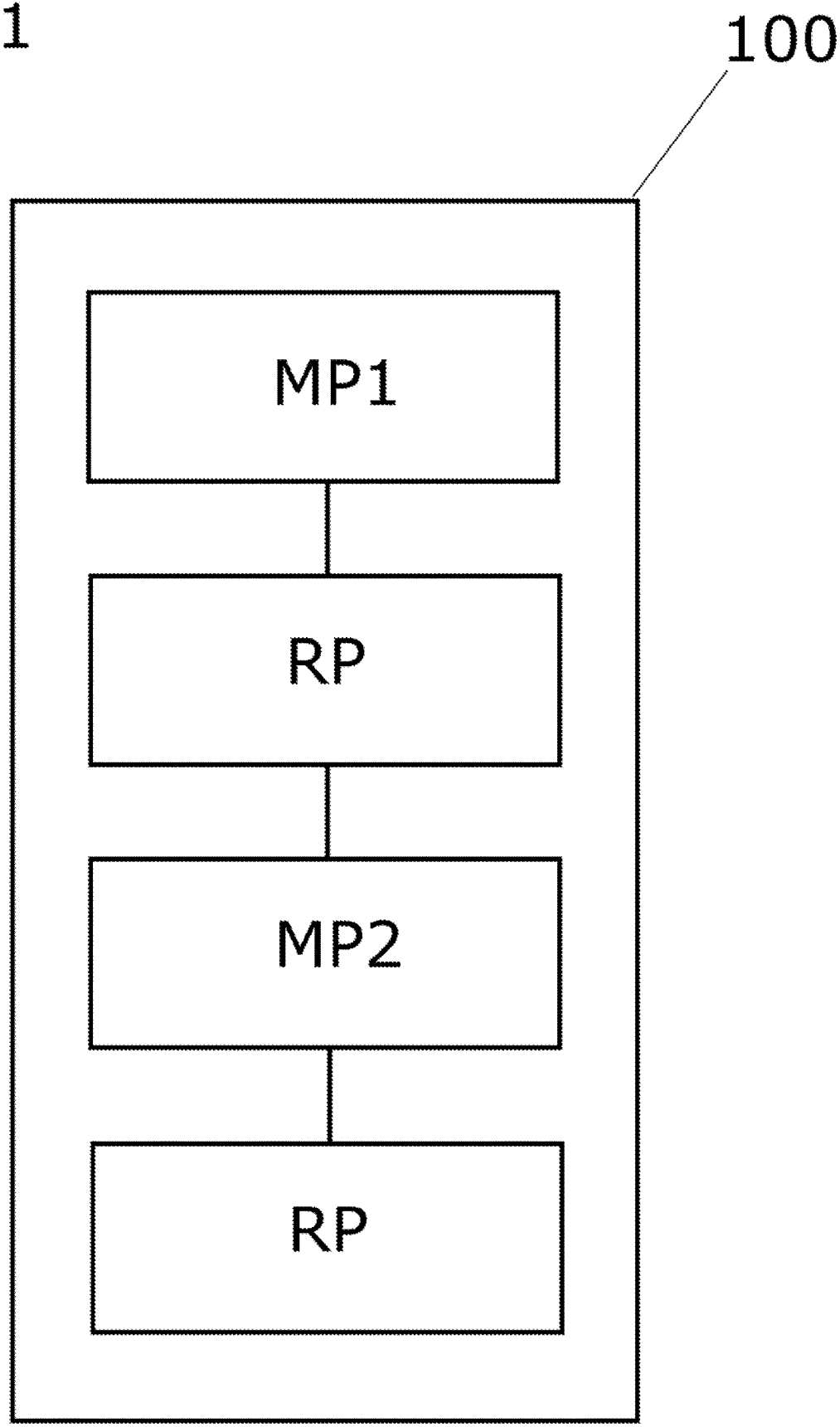
FIG. 1 shows a schematic process flow.

FIG. 1 shows a schematic flow diagram of the method 100 of the invention. First, a magnet system M is supplied during a measuring phase MP1 preceding a polarity reversal phase RP via a polarity reversal circuit PRC with an essentially constant voltage UK1 from a first voltage source Q1 of a power supply PS. Furthermore, a capacitor unit CU of a second voltage source Q2 of the power supply PS is charged during the measuring phase MP1, so that the capacitor unit CU at the end of the measuring phase MP1 is charged with a charging voltage, so that with the beginning of a following polarity reversal phase RP the magnet system M at the beginning of the polarity reversal phase can be supplied with a beginning value UB of a variable overvoltage OU.

With the end of the measuring phase MP1, a polarity reversal phase RP begins. The operating circuit alternates for power supply from the second voltage source Q2 and switches switch elements S1 to S4, in order to change the polarity of the magnetic field. During the polarity reversal phase RP, the magnet system M is supplied with the variable overvoltage OU, wherein the overvoltage OU has the beginning value UB at the beginning of the polarity reversal phase and an end value UE at the end of the polarity reversal phase, and wherein the magnitude of the starting value UB is greater than the magnitude of the end value UE. Furthermore, at the beginning of the polarity reversal phase RP, the capacitor of the first voltage source Q1 is charged by the magnet system due to a transient characteristic of the magnet system.

After termination of the polarity reversal phase, a measuring phase MP2 begins. During the measuring phase MP2, the magnet system M is supplied via the polarity reversal circuit PRC with an essentially constant voltage UK2 from the first voltage source Q1 of the power supply PS. The magnitude of the voltage value UE of the preceding polarity reversal phase is, in such case, greater than or equal to the voltage UK2. Furthermore, the capacitor unit CU of the second voltage source Q2 of the power supply PS is charged during the measuring phase MP2, so that the capacitor unit CU at the end of the measuring phase MP2 is charged with a charging voltage, so that, with the beginning of a following polarity reversal phase (RP), the magnet system M can be supplied at the beginning of the polarity reversal phase with a beginning value UB of the variable overvoltage OU.

Following the measuring phase MP2, a new polarity reversal phase RP begins. The operating circuit transfers for power supply from the second voltage source Q2 and switches switch elements S1 to S4, in order to change the polarity of the magnetic field. During the polarity reversal phase RP, the magnet system M is supplied with a variable overvoltage OU, wherein the overvoltage OU has a beginning value UB at the beginning of the polarity reversal phase and an end value UE at the end of the polarity reversal phase, and wherein the magnitude of the starting value UB is greater than the magnitude of the end value UE. Furthermore, at the beginning of the polarity reversal phase RP, the capacitor of the first voltage source Q1 is charged by the magnet system due to a transient characteristic of the magnet system.

With the end of the polarity reversal phase after the measuring phase MP2, a measuring phase-polarity reversal phase cycle is passed through and a new cycle starts with a measuring phase MP1. The magnitude of the voltage value UE of the preceding polarity reversal phase is, in such case, greater than or equal to the voltage UK1 of the measuring phase MP1.

Figure 2:
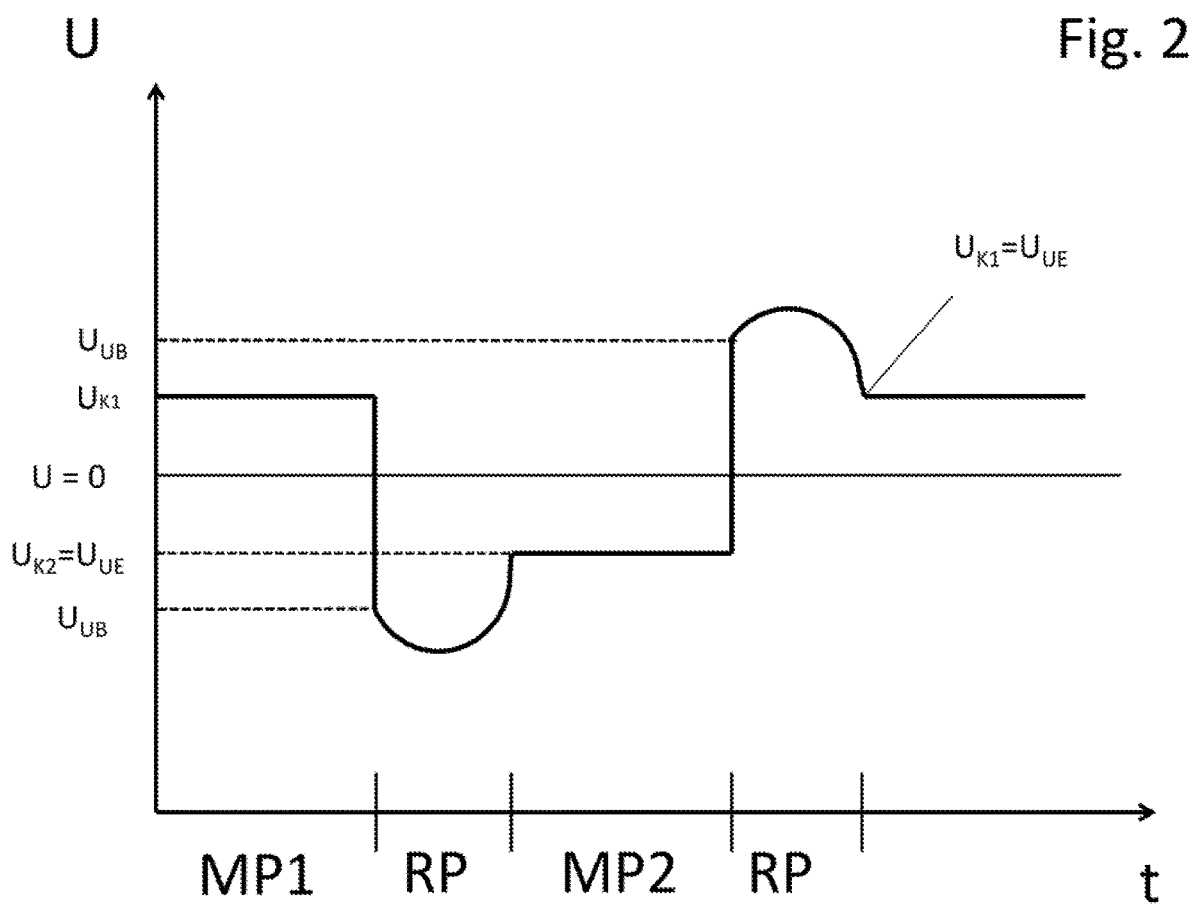
FIG. 2 shows schematically as a function of time, voltages applied to the magnet system in accordance with the present invention.

FIG. 2 shows a schematically as a function of time the voltage U applied to the magnet system M. During a measuring phase MP1, an essentially constant voltage UK1 is applied for driving an essentially constant electrical current in the magnet system. Thus, a constant magnetic field is produced in the measuring tube 10 for inducing an electrical voltage in the flowing medium. At the same time, the capacitor unit CU of the second voltage source Q2 is charged.

With the end of the measuring phase MP1, a polarity reversal phase is introduced, wherein the power supply of the magnet system M is provided by the capacitor unit CU, so that, at the beginning of the polarity reversal phase RP, a voltage UB is applied to the magnet system. Because of a transient characteristic of the magnet system, the capacitor unit CU is charged by the magnet system, at least at the beginning of the polarity reversal phase. In this way, the magnitude of the voltage across the capacitor and that applied to the magnet system M, at first, increases. With decay of the transient, the capacitor begins to discharge, so that the magnitude of the voltage across the magnet system M sinks, until the polarity reversal phase of the magnet system is terminated. At the end of the polarity reversal phase, a voltage UE lies against the magnet system, wherein the magnitude of the voltage UB is greater than the magnitude of the voltage UE. The has the result that there is stored in the capacitor an energy amount, which is sufficient that energy supply of the magnet system M during the polarity reversal phase is able to occur completely from the capacitor. Ideally, the voltage UE corresponds about to the voltage UK2 of the measuring phase MP2 following thereon. In this way, a transient behavior of the power supply at the beginning of the measuring phase MP2 can be lessened or suppressed.

During the following measuring phase MP2, an essentially constant voltage UK2 is applied to the magnet system.

The voltage following the measuring phase MP2 is also shown.

Figure 3:
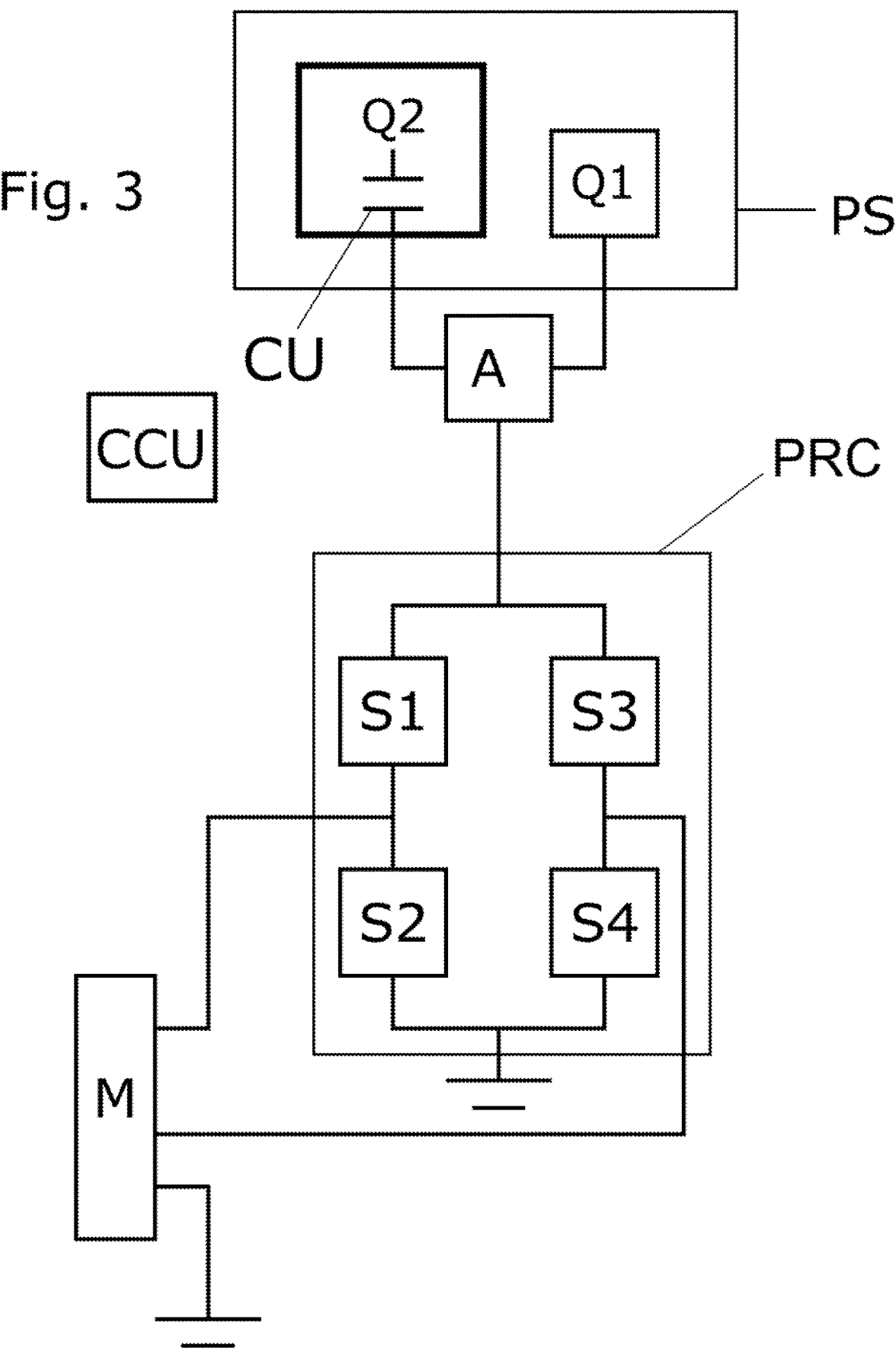
FIG. 3 shows the schematic construction of an electronic operating circuit of the invention.

FIG. 3 shows a schematic circuit of the electronic components relevant to the invention for a magneto inductive flow measuring device of the invention, including a magnet system M, a polarity reversal circuit PRC, a central control unit CCU, an alternation circuit A and a power supply PS containing a first voltage source Q1 and a second voltage source Q2, wherein the second voltage source Q2 has a capacitor unit CU.

The polarity reversal circuit includes four switch elements, which can assume the states "conductive" and "non-conductive", wherein a first switch element S1 and second switch element S2 form a first series connection, and wherein a third switch element S3 and a fourth switch element S4 form a second series connection and wherein the first series connection and the second series connection are connected in parallel. The operation of the magnet system with a voltage occurs by tapping a first electrical potential between the first switch element and the second switch element and a second electrical potential between the third switch element and the fourth switch element. Alternately, the switch elements S1 and S4 are switched to conduct and the switch elements S2 and S3 are switched not to conduct, and, then, vice versa. How the switch elements S1 to S4 are switched, thus, determines the direction of the potential drop across the magnet system M. The switch elements can be, for example, transistors or relays.

The alternation circuit A alternates between power supply of the magnet system from the first voltage source Q1 and from the second voltage source Q2.

The alternation circuit A and the polarity reversal circuit PRC are controlled by the central control unit CCU, which is, for example, a microprocessor with a software for operating the microprocessor. For reasons of perspicuity, FIG. 3 does not show connections of the central control unit CCU to the alternation circuit A or to the switch elements of the polarity reversal circuit PRC.

Figure 4:
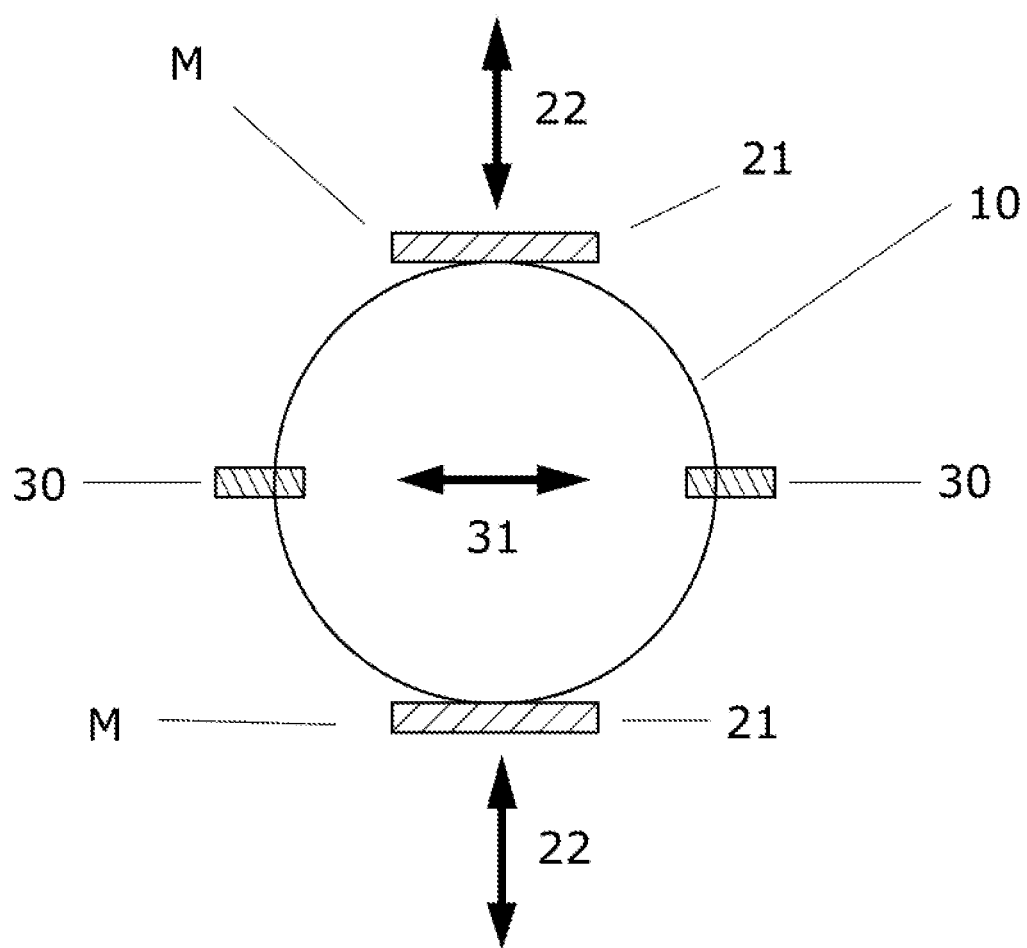
FIG. 4 shows a schematic cross section of a magneto inductive flow measuring device of the invention.

FIG. 4 shows, by way of example, a cross section through a magneto inductive flow measuring device, which comprises a measuring tube 10, a magnet system M having two coils 21 for producing a magnetic field 22, which extends essentially perpendicularly to a measuring tube axis and two measuring electrodes 30. The magnetic field 22 produces in the medium flowing through the measuring tube 10 a flow dependent voltage 31, which is tapped from the measuring electrodes. Ideally, the magnetic field 22 is returned between the coils 21 outside of the measuring tube via a metal, field return guide (not shown). Control of the magnet system M and the tapping and evaluation of the voltage tapped from the measuring electrodes 20 is assured by the electronic operating circuit. The connecting of the magnet system as well as the measuring electrodes to the electronic operating circuit is, for reasons of perspicuity, not shown.

Figure 5:
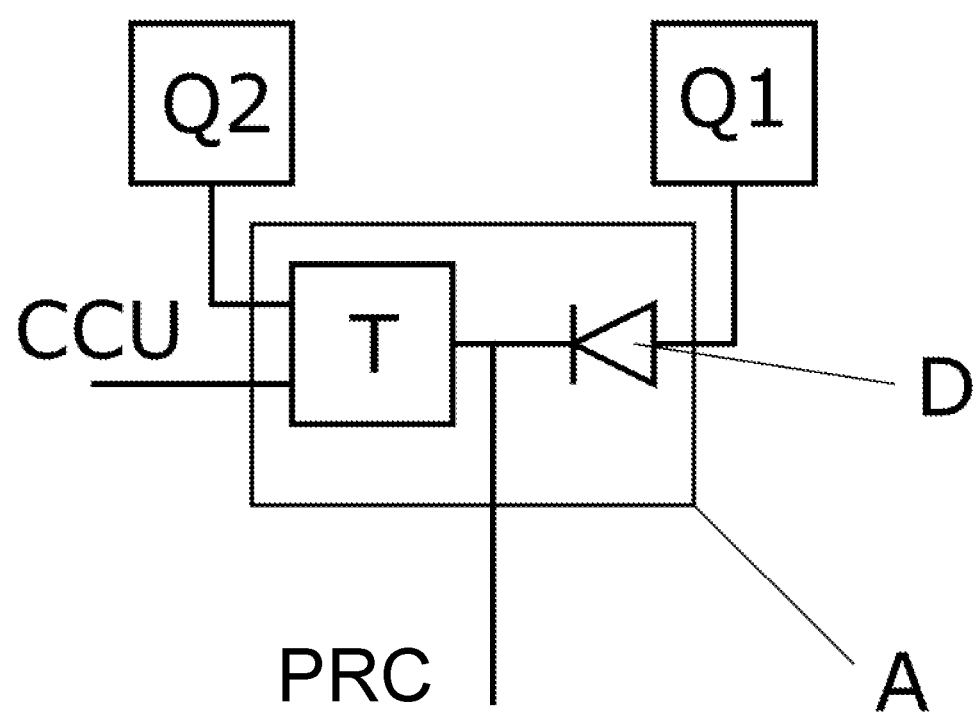
FIG. 5 shows an example of construction of an alternation element of the invention.

FIG. 5 shows an example of an alternation element A of the invention, which has a transistor T and a diode D, wherein the collector of the transistor is connected with the second voltage source Q2 and the base area of the transistor with the central control unit. The emitter of the transistor is connected with the polarity reversal circuit PRC, wherein the first voltage source Q1 is connected via the diode D with the emitter and the polarity reversal circuit, wherein the diode is oriented in conduction direction from the first voltage source Q1 to the emitter. During a measuring phase, the transistor is blocking, so that the first voltage source Q1 is used for energy supply of the magnet system. During a polarity reversal phase, the transistor is conductive. Since the overvoltage OU, which is produced from the second voltage source Q2, is greater in magnitude than the voltage UK1, UK2, produced from the first voltage source Q1, only the second voltage source Q2 cares for energy supply of the magnet system M during the polarity reversal phase.

The invention claimed is:

1. A method for operating a magneto inductive flow measuring device for measuring flow velocity or volume flow of a medium in a measuring tube, comprising:

providing a magneto inductive flow measuring device, including:

a measuring tube having a longitudinal axis;

a magnet system having at least one coil configured to produce a magnetic field perpendicular to the longitudinal axis of the measuring tube and periodically changing polarity for inducing a flow-dependent voltage in the medium;

a power supply including a first voltage source and a second voltage source, wherein the second voltage source includes a capacitor unit configured to store energy;

an electronic operating circuit including a polarity reversal circuit; and at least two measuring electrodes embodied to measure a voltage induced in a flowing medium, wherein the electronic operating circuit is configured to evaluate the measured voltage;

allowing a liquid medium to flow through the measuring tube;

connecting the magnet system via the polarity reversal circuit to a power supply, wherein the connection is in a first voltage polarity;

applying via the polarity reversal circuit a first constant voltage to the magnet system from the first voltage source and charging the capacitor unit from the first voltage source during a first measuring phase, whereby a constant magnetic field is generated by the magnet system;

measuring a voltage induced by the constant magnet field in the flowing medium;

changing the voltage polarity of the connection to a second voltage polarity different from the first voltage polarity using the polarity reversal circuit;

applying via the polarity reversal circuit a variable overvoltage to the magnet system from the second voltage source during a polarity reversal phase; and applying via the polarity reversal circuit a second constant voltage to the magnet system from the first voltage source during a second measuring phase, wherein the variable overvoltage has a beginning value at a beginning of the polarity reversal phase and an end value at an end of the polarity reversal phase, and wherein a magnitude of the beginning value is greater than a magnitude of the end value, wherein the capacitor unit is charged by the magnet system at the beginning of the polarity reversal phase by a transient characteristic of the magnet system, and wherein at the end of the polarity reversal phase, energy supply of the magnet system occurs at least partially from the capacitor unit.

2. The method as claimed in claim 1, wherein at the end of the polarity reversal phase the energy supply of the magnet system is completely from the capacitor unit.

3. The method as claimed in claim 2, wherein during the entire polarity reversal phase the energy supply of the magnet system is completely from the capacitor unit.

4. The method as claimed in claim 1, further comprising: setting the magnitude of the end value greater than a magnitude of the first voltage.

5. The method as claimed in claim 1, further comprising: setting the magnitude of the end value equal to a magnitude of the first voltage.

6. The method as claimed in claim 1, further comprising: limiting the magnitude of the overvoltage to less than or equal to 70V.

7. The method as claimed in claim 1, wherein the capacitor is charged during the measuring phase by the second voltage source.

8. A magneto inductive flow measuring device for measuring flow velocity or volume flow of a medium in a measuring tube, comprising:

a measuring tube having a longitudinal axis;

a magnet system having at least one coil configured to produce a magnetic field perpendicular to the longitudinal axis of the measuring tube;

at least two measuring electrodes disposed in the measuring tube and configured to register a flow-dependent voltage induced by the magnetic field in a medium;

a power supply including a first voltage source and a second voltage source, wherein the second voltage source includes a capacitor unit configured to store energy;

an alternation element configured to connect the magnet system to either the first voltage source or the second voltage source; and an electronic operating circuit including a polarity reversal circuit, wherein the electronic operating circuit is configured to operate the magnet system, the at least two measuring electrodes, the alternation element, and the polarity reversal circuit, and wherein the electronic operating circuit is further configured to:
connect the magnet system via the polarity reversal circuit to the first voltage source, wherein the connection is in a first voltage polarity;

apply via the polarity reversal circuit a first constant voltage to the magnet system from the first voltage source and charge the capacitor unit from the first voltage source during a first measuring phase, whereby a constant magnetic field is generated by the magnet system;

measure via the at least two measuring electrodes a voltage induced by the constant magnet field in the flowing medium;

change the voltage polarity of the connection to a second voltage polarity different from the first voltage polarity using the polarity reversal circuit;

apply via the polarity reversal circuit a variable overvoltage to the magnet system from the second voltage source during a polarity reversal phase; and apply via the polarity reversal circuit a second constant voltage to the magnet system from the first voltage source during a second measuring phase, wherein the variable overvoltage has a beginning value at a beginning of the polarity reversal phase and an end value at an end of the polarity reversal phase, and wherein a magnitude of the beginning value is greater than a magnitude of the end value, wherein the capacitor unit is charged by the magnet system at the beginning of the polarity reversal phase by a transient characteristic of the magnet system, and wherein at the end of the polarity reversal phase, energy supply of the magnet system occurs at least partially from the capacitor unit.

9. The magneto inductive flow measuring device as claimed in claim 8, wherein the second voltage source is adapted to charge the capacitor unit.

10. The magneto inductive flow measuring device as claimed in claim 8, wherein the alternation element includes at least one transistor and at least one diode.

11. The magneto inductive flow measuring device as claimed in claim 8, wherein the operating circuit includes a central control unit embodied to control the polarity reversal circuit and the alternation circuit.

12. The magneto inductive flow measuring device as claimed in claim 8, wherein the polarity reversal circuit includes four switch elements, wherein a first switch element and second switch element form a first series connection, wherein a third switch element and a fourth switch element form a second series connection, and wherein the first series connection and the second series connection are connected in parallel.

13. The magneto inductive flow measuring device as claimed in claim 12, wherein operation of the magnet system occurs with a voltage obtained by tapping a first electrical potential between the first switch element and the second switch element and a second electrical potential between the third switch element and the fourth switch element.

\* \* \* \* \*